(12) United States Patent
Kishima et al.

(10) Patent No.: US 7,731,274 B2
(45) Date of Patent: Jun. 8, 2010

(54) BODY SUPPORT STRUCTURE OF A VEHICLE

(75) Inventors: Fumihiko Kishima, Konan (JP); Yoshihiro Juasa, Toyota (JP); Yukinori Osada, Toyota (JP); Toshihiro Fujiwara, Toyota (JP); Mitsuhiro Hamada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 266 days.

(21) Appl. No.: 11/905,466

(22) Filed: Oct. 1, 2007

(65) Prior Publication Data

US 2008/0084093 A1 Apr. 10, 2008

(30) Foreign Application Priority Data

Oct. 6, 2006 (JP) ............................ 2006-274786

(51) Int. Cl.
*B62D 25/20* (2006.01)
(52) U.S. Cl. ................................................. 296/203.03
(58) Field of Classification Search ............ 296/203.01, 296/204, 203.03, 193.05, 187.12, 187.08
See application file for complete search history.

(56) References Cited

U.S. PATENT DOCUMENTS 5,352,011 A * 10/1994 Kihara et al. .......... 296/203.03
5,577,797 A * 11/1996 Takanishi ............... 296/203.03
5,700,049 A * 12/1997 Shibata .................. 296/203.03
7,163,259 B2 * 1/2007 Hayashi ....................... 296/204
7,416,242 B2 * 8/2008 Godfrey et al. ......... 296/187.08
2008/0106119 A1* 5/2008 Ma et al. ................ 296/187.12

FOREIGN PATENT DOCUMENTS

| JP | A-05155358 | 6/1993 |
| JP | A-08-058628 | 3/1996 |
| JP | A-11115819 | 4/1999 |

* cited by examiner

*Primary Examiner*—H Gutman
(74) *Attorney, Agent, or Firm*—Oliff & Berridge, PLC

(57) ABSTRACT

A pair of left and right rockers are arranged along a vehicle longitudinal direction at lower portions of two vehicle lateral direction ends of a body. A floor cross-member is provided at each of two vehicle lateral direction end portions of a cross member, which is arranged along the vehicle lateral direction at a lower portion of the body. A lower side joining flange of each rocker and a vehicle lateral direction outer side end portion of a bottom wall portion of each floor cross-member are joined together by a mount bracket. With the rocker and/or the floor cross-member, the mount bracket forms a closed cavity, of which a vehicle lateral direction outer side portion extends beneath a rocker inner. A nut is provided in the closed cavity for joining the body with a body mount, which is fixed to a chassis frame.

4 Claims, 6 Drawing Sheets

BODY SUPPORT STRUCTURE OF A VEHICLE

CROSS-REFERENCE TO RELATED APPLICATION

This application claims priority under 35 USC 119 from Japanese Patent Application No. 2006-274786, the disclosure of which is incorporated by reference herein.

BACKGROUND OF THE INVENTION

1. Technical Field

The present invention relates to a body support structure of a vehicle, and more particularly to a vehicle body support structure at which a body rests on a chassis frame via a body mount.

2. Related Art

As has been described in, for example, Japanese Patent Application Laid-Open (JP-A) No. 8-58628, a vehicle body support structure in which a body rests on a frame via a body mount has been known heretofore. In such a technology, a mount bracket at the body, which is to be supported at the body mount, is fixed by welding to a vehicle lateral direction inner side face of a rocker inner panel and to a floor panel.

However, with the vehicle body support structure described above, an amount of offset in a vehicle lateral direction between a rocker, at which a center pillar is disposed, and the body mount is large. Consequently, in order for a load acting on the rocker from the center pillar at a time of rollover to be efficiently transmitted through the mount bracket to the body mount, reinforcement of the mount bracket is necessary, and weight is greatly increased.

SUMMARY

In consideration of the circumstances described above, the present invention will provide a body support structure of a vehicle that can efficiently transmit a load from a rocker to a body mount, without being associated with a large increase in weight.

A first aspect of the present invention is a vehicle body support structure, including a body mount provided at a chassis frame, the body mount supporting a body; a rocker disposed with a length direction thereof aligned along a vehicle longitudinal direction at a lower portion of each of two vehicle lateral direction ends of the body; a vehicle lateral direction closed section portion, formed with a length direction thereof aligned along the vehicle lateral direction at a lower portion of the body, a vehicle lateral direction end portion of the vehicle lateral direction closed section portion being joined to the rocker; a mount bracket of which a vehicle lateral direction outer side portion is joined to a lower portion of the rocker, a vehicle lateral direction inner side portion of the mount bracket being joined to a lower face of the vehicle lateral direction closed section portion and forming a closed cavity which extends beneath the rocker; and a body mount-joining member that joins the body mount with the mount bracket.

BRIEF DESCRIPTION OF THE DRAWINGS

Embodiments of the present invention will be described in detail based on the following figures, wherein.

DETAILED DESCRIPTION OF THE INVENTION

Figure 1:
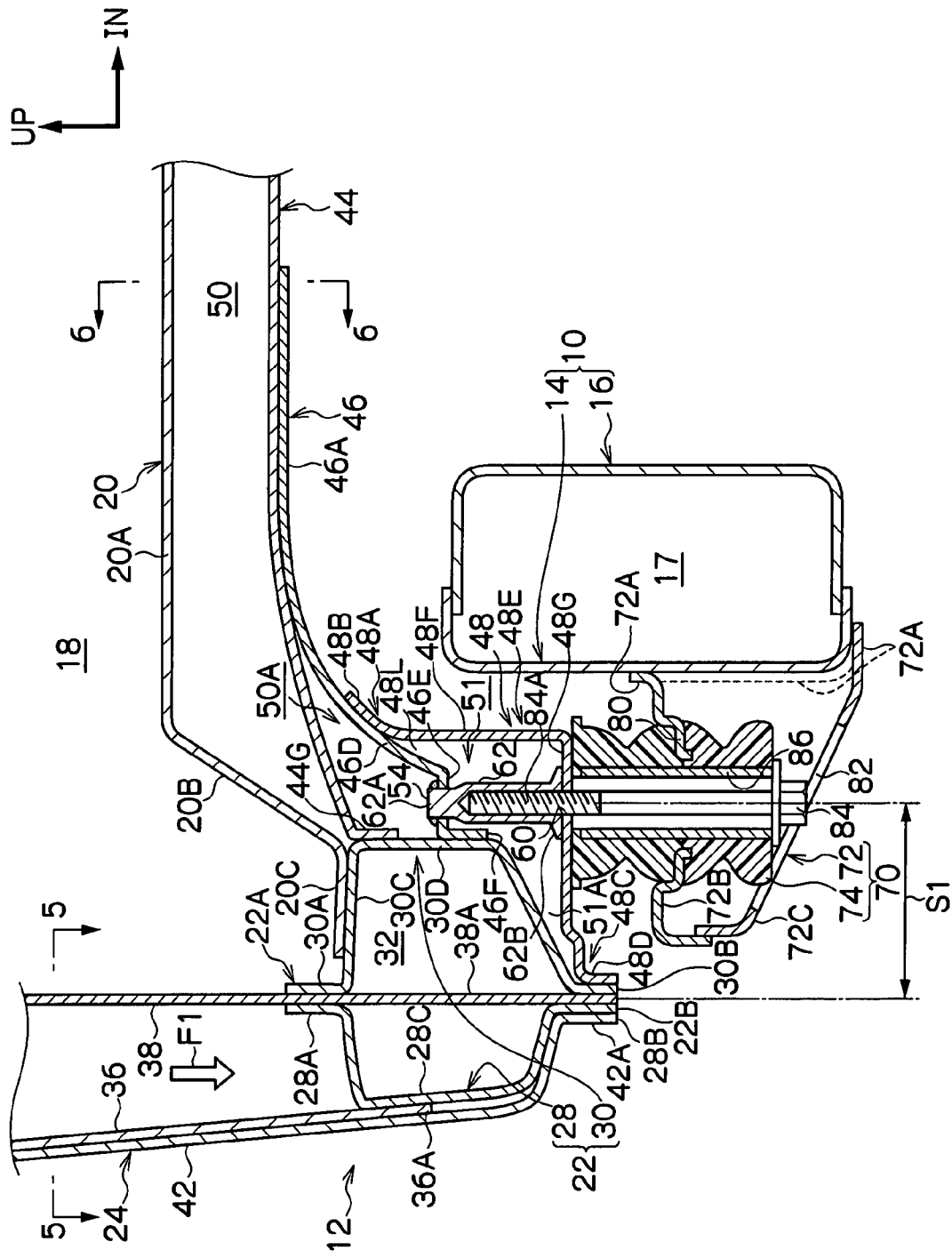
FIG. 1 is a magnified sectional view along a section 1-1 of FIG. 2.

Herebelow, an example of an exemplary embodiment of the present invention will be described in detail with reference to the drawings.

A first embodiment of the body support structure of a vehicle of the present invention will be described in association with FIG. 1 to FIG. 5.

Note that, in the drawings, the arrow UP indicates an upward direction of the vehicle, the arrow FR indicates a forward direction of the vehicle and the arrow IN indicates an inward direction of the vehicle.

Figure 2:
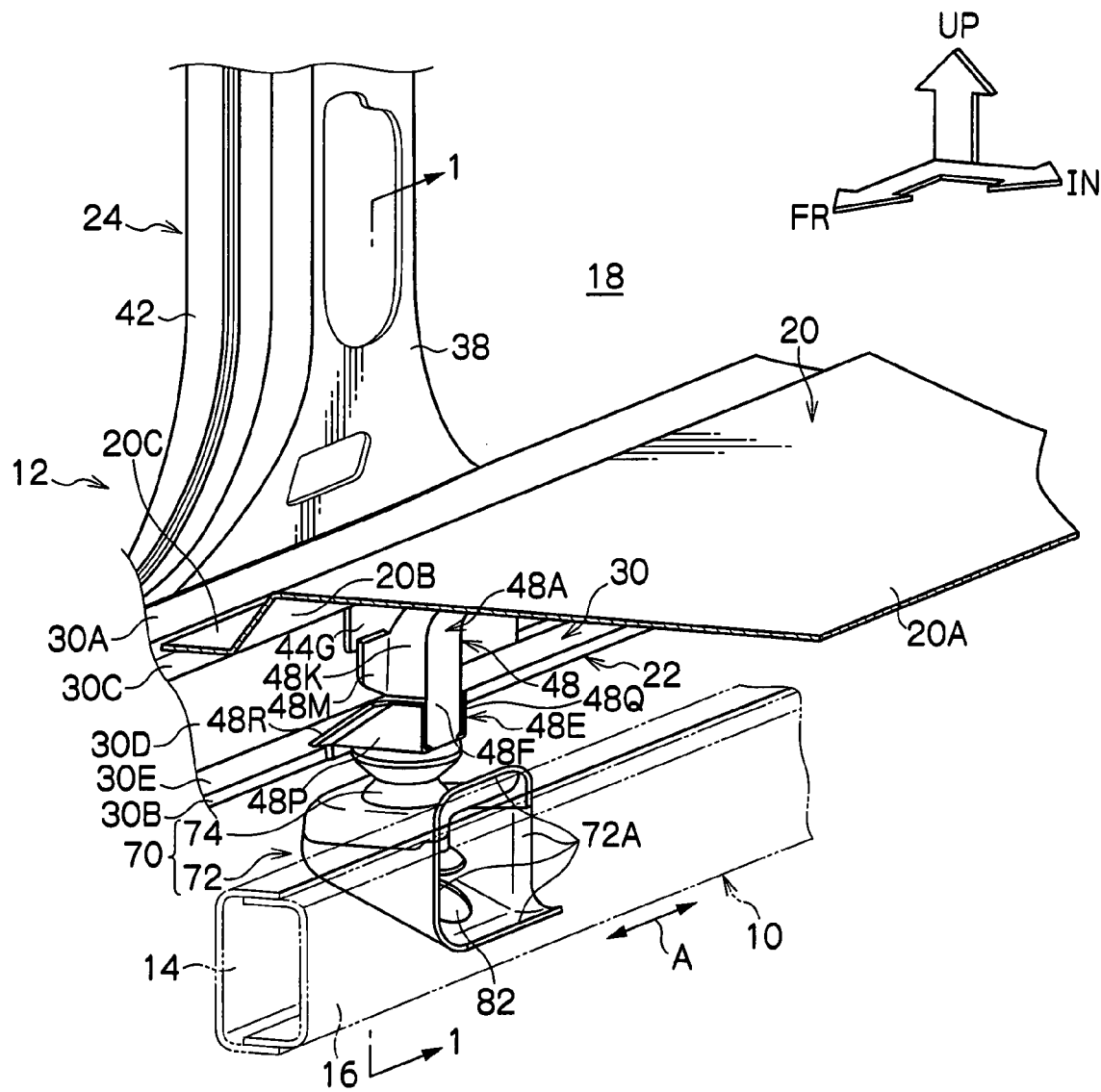
FIG. 2 is a perspective view showing a vehicle body support structure relating to a first embodiment of the present invention, viewed from an upper-inward angle forward of the vehicle.

FIG. 2 shows the vehicle body support structure relating to the first embodiment of the present invention, in a perspective view seen from above in a forward-inward diagonal direction of the vehicle.

In FIG. 2, a chassis frame 10 is shown by broken lines in order to clarify structure.

As shown in FIG. 2, an automobile of the present embodiment is provided with a pair of the chassis frame 10 at left and right. The chassis frames 10 are disposed along a vehicle longitudinal direction at lower portions of two lateral direction ends of the vehicle. The structure of the automobile is also provided with a body 12, which rests on the chassis frames 10, via body mounts which will be described later.

The vehicle is structured with left-right symmetry with respect to the middle of the vehicle lateral direction. Only the right side of the vehicle is shown in FIG. 2.

The chassis frame 10 is equipped with a chassis frame outer 14, which structures a vehicle lateral direction outer side portion of the chassis frame 10, and a chassis frame inner 16, which structures a vehicle lateral direction inner side portion of the chassis frame 10. Thus, the chassis frame 10 is a closed section structure 17 along the vehicle longitudinal direction.

Herein, a "closed section structure" means a cross-sectional structure in which an aperture outer periphery portion is substantially continuous in a subject sectional plane and has high strength and high rigidity. The point of "substantially" is to include a structure in which holes and the like which are small compared to a length of the aperture outer periphery are locally formed in the subject sectional plane, but there are no holes or the like at a near side and a far side with respect to a direction perpendicular to the sectional plane (i.e., in the case of the chassis frame 10 shown in FIG. 2, the direction of arrow A in the drawing) and members of the aperture portion periphery are provided continuous manner.

The body 12 is provided with a floor panel 20, which structures a floor surface of the body 12, and a pair of left and right rockers 22, which are disposed along the vehicle longitudinal direction at lower portions of the body 12 at the two vehicle lateral direction ends thereof. The body 12 is also provided with a pair of left and right center pillars 24, which are disposed along a vehicle vertical direction at the two vehicle lateral direction end portions of the body 12. Lower end portions of the center pillars 24 are joined to the rockers 22.

FIG. 1 shows a magnified sectional view along a section 1-1 of FIG. 2.

As shown in FIG. 1, the rocker 22 is provided with a rocker outer 28, which structures a vehicle lateral direction outer side portion of the rocker 22, and a rocker inner 30, which structures a vehicle lateral direction inner side portion of the rocker 22. Thus, the rocker 22 is a closed section structure 32 along the longitudinal direction of the vehicle. An upper side joining flange 22A is at an upper end of the rocker 22. An upper flange 28A of the rocker outer 28 and an upper flange 30A of the rocker inner 30 are joined at the upper side joining flange 22A. A lower side joining flange 22B is at a lower end of the rocker 22. The lower side joining flange 22B is a lower portion joining portion at which a lower flange 28B of the rocker outer 28 and a lower flange 30B of the rocker inner 30 are joined.

Figure 5:
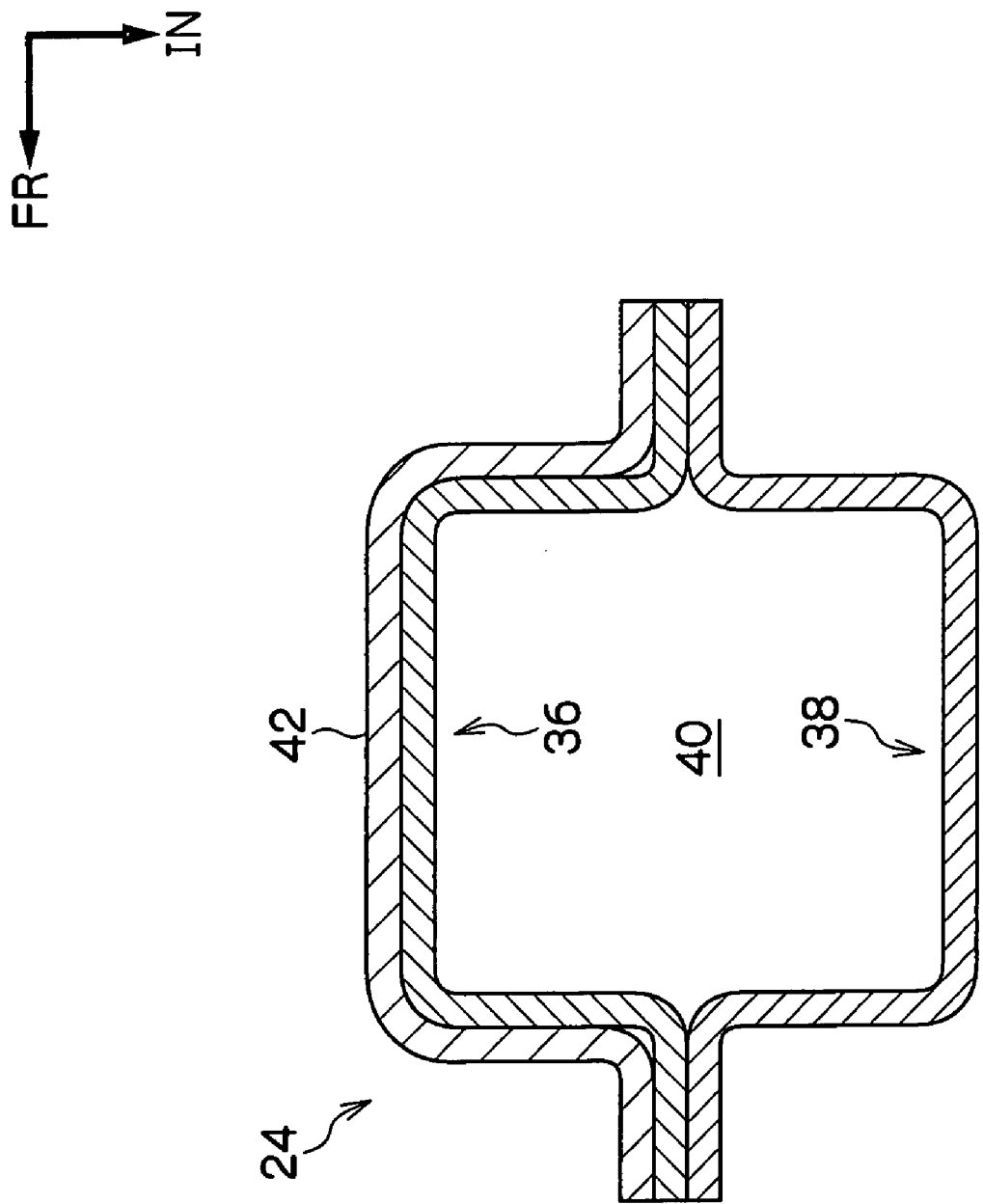
FIG. 5 is a magnified sectional view along a section 5-5 of FIG. 1.

FIG. 5 shows a magnified sectional view along a section 5-5 of FIG. 1.

As shown in FIG. 5, the center pillar 24 is provided with a center pillar outer panel 36, which structures a vehicle lateral direction outer side portion of the center pillar 24, and a center pillar inner panel 38, which structures a vehicle lateral direction inner side portion of the center pillar 24. Thus, a closed section structure 40 along the vehicle vertical direction is formed by the center pillar outer panel 36 and the center pillar inner panel 38. A sidewall outer 42 is disposed at the vehicle lateral direction outer side of the center pillar outer panel 36.

As shown in FIG. 1, a lower end 36A of the center pillar outer panel 36 is joined to a vehicle lateral direction outer side face of a vertical wall portion 28C of the rocker outer 28, by welding or the like. Meanwhile, a lower portion 38A of the center pillar inner panel 38 is inserted into the closed section structure of the rocker 22, and is joined by welding or the like between the upper flange 28A of the rocker outer 28 and the upper flange 30A of the rocker inner 30 and between the lower flange 28B of the rocker outer 28 and the lower flange 30B of the rocker inner 30. Furthermore, a flange 42A formed at a lower end of the sidewall outer 42 is joined to a vehicle lateral direction outer side face of the lower flange 28B of the rocker outer 28, by welding or the like.

An angled portion 20B, which is angled downward to the outer side of the vehicle lateral direction, is formed at a vehicle lateral direction outer side end portion of a general portion 20A of the floor panel 20. A flange 20C, which is angled to the outer side in the vehicle lateral direction, is formed from a lower end of the angled portion 20B. The flange 20C is joined to an upper face of a top wall portion 30C of the rocker inner 30, by welding or the like.

Figure 3:
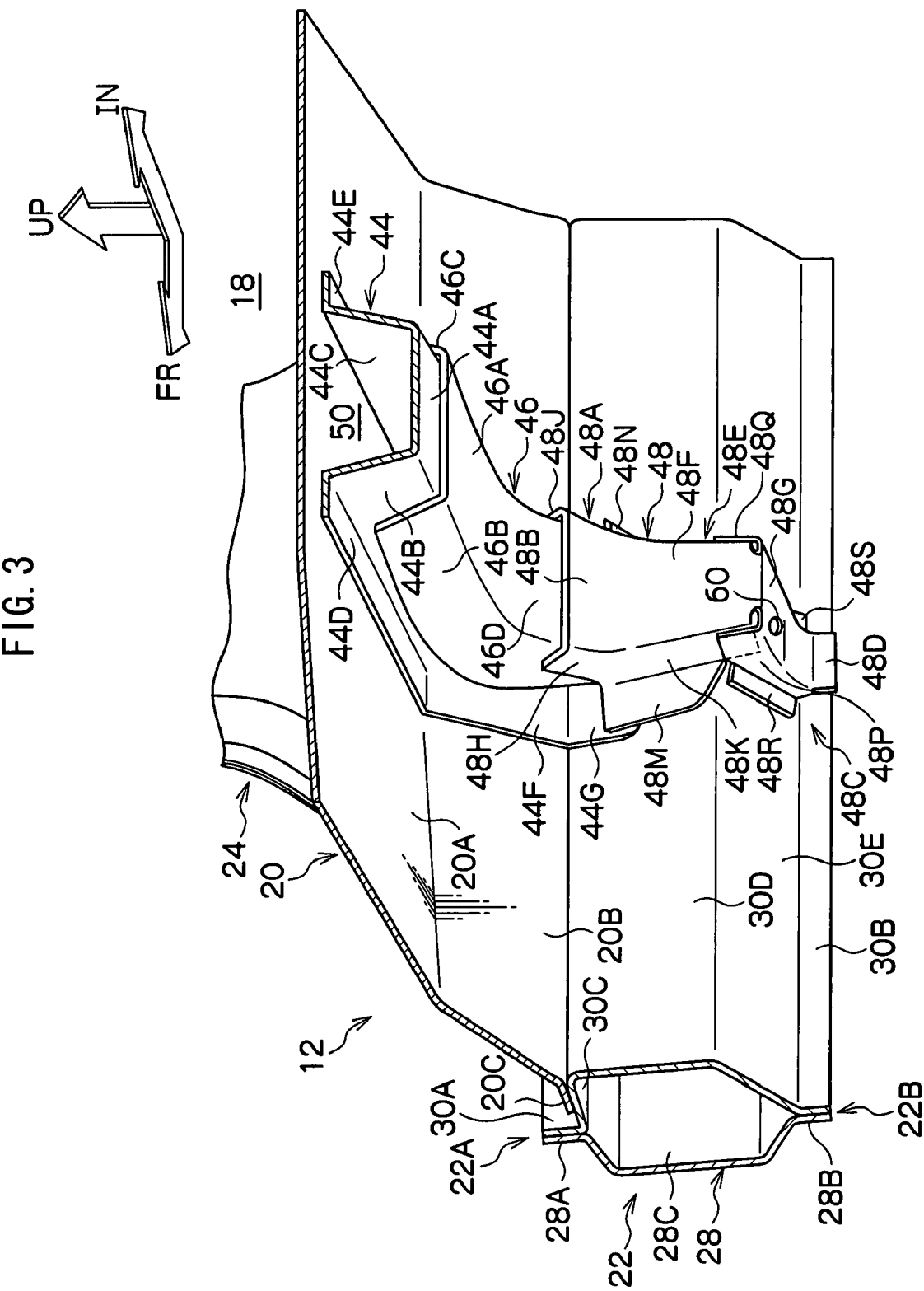
FIG. 3 is a perspective view showing a portion of the vehicle body support structure relating to the first embodiment of the present invention, viewed from a lower-inward angle forward of the vehicle.

FIG. 3 shows a portion of the vehicle body support structure relating to the first embodiment of the present invention, in a perspective view seen from below in a forward-inward diagonal direction of the vehicle.

As shown in FIG. 3, the body 12 is provided with a cross member 44 arranged along the vehicle lateral direction at a lower portion of the body 12. A floor cross-member 46 is disposed at a lower portion of the cross member 44 at a vehicle lateral direction outer side thereof, and a mount bracket 48 is disposed at a vehicle lateral direction outer side lower portion of the floor cross-member 46.

A sectional form of the cross member 44 in the vehicle longitudinal direction is a hat-like cross-sectional shape of which an opening portion is oriented toward the upper side of the vehicle. A front wall portion 44B and a rear wall portion 44C are formed toward the upper side of the vehicle from two vehicle longitudinal direction ends of a bottom wall portion 44A, a front flange 44D is formed toward the forward side of the vehicle from an upper end of the front wall portion 44B, and a rear flange 44E is formed toward the rear side of the vehicle from an upper end of the rear wall portion 44C.

The front flange 44D and rear flange 44E of the cross member 44 are joined to a lower face of the general portion 20A of the floor panel 20 by welding or the like. A flange 44F, which is angled toward the lower side of the vehicle, is formed at a vehicle lateral direction outer side end portion of the cross member 44. The flange 44F is joined to the lower face of the angled portion 20B of the floor panel 20 by welding or the like. A lower portion 44G of the flange 44F is joined to a vehicle lateral direction inner side face of a vertical wall portion 30D of the rocker inner 30, by welding or the like.

Figure 4:
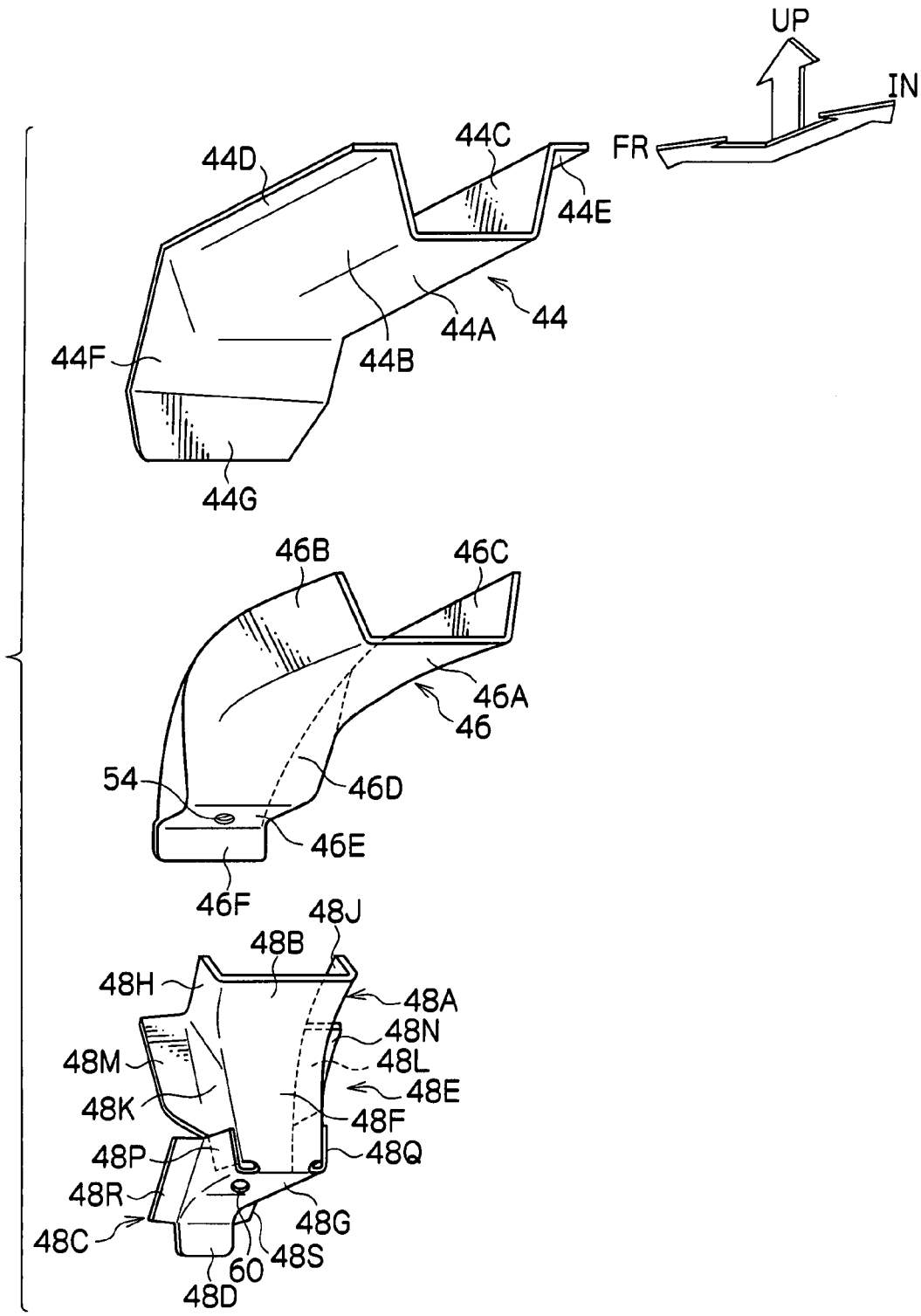
FIG. 4 is an exploded perspective view showing a portion of the vehicle body support structure relating to the first embodiment of the present invention, viewed from a lower-inward angle forward of the vehicle.

FIG. 4 shows a portion of the vehicle body support structure relating to the first embodiment of the present invention, in an exploded perspective view seen from below in a forward-inward diagonal direction of the vehicle.

As shown in FIG. 4, a form of the floor cross-member 46 in the vehicle longitudinal direction is a bowl shape of which an opening portion is oriented toward the upper side of the vehicle. A front wall portion 46B and a rear wall portion 46C are formed toward the upper side of the vehicle from two vehicle longitudinal direction ends of a bottom wall portion 46A. The front wall portion 46B is joined to a front face of the front wall portion 44B of the cross member 44 by welding or the like, and the rear wall portion 46C is joined to a rear face of the rear wall portion 44C of the cross member 44 by welding or the like.

The bottom wall portion 46A of the floor cross-member 46 is joined to a lower face of the bottom wall portion 44A of the cross member 44 by welding or the like. A vehicle lateral direction outer side end portion 46D of the bottom wall portion 46A separates from the bottom wall portion 44A of the cross member 44 and extends downward toward the outer side of the vehicle. A bottom wall portion 46E, which is angled toward the vehicle lateral direction outer side, is formed from a lower end of the vehicle lateral direction outer side end portion 46D. A through-hole 54 is formed through a middle portion of the bottom wall portion 46E. A flange 46F, which is angled toward the lower side of the vehicle, is formed at a vehicle lateral direction outer end of the bottom wall portion 46E.

As shown in FIG. 1, the flange 46F of the floor cross-member 46 is joined to the vehicle lateral direction inner side face of the vertical wall portion 30D of the rocker inner 30, by welding or the like.

Thus, a vehicle lateral direction outer side end portion 50A is formed by the cross member 44 and the floor cross-member 46. The vehicle lateral direction outer side end portion 50A is provided beneath a vehicle lateral direction closed section portion 50, which is a closed section structure along the vehicle lateral direction. The vehicle lateral direction outer side end portion 50A is formed to be close to the rocker 22.

As shown in FIG. 4, a vehicle lateral direction inner side end portion of the mount bracket 48 forms a cross-member attachment portion 48A, which extends upward toward the vehicle lateral direction inner side.

As shown in FIG. 1, an upper portion of a vertical wall portion 48B of the cross-member attachment portion 48A of the mount bracket 48 is joined to a lower face of the vehicle lateral direction outer side end portion 46D of the floor cross-member 46, by welding or the like. A vehicle lateral direction outer side end portion of the mount bracket 48 forms a rocker attachment portion 48C. A lower flange 48D is formed toward the lower side of the vehicle from a vehicle lateral direction outer side end portion of the rocker attachment portion 48C. The lower flange 48D is joined to a vehicle lateral direction inner side face of the lower flange 30B of the rocker inner 30, by welding or the like. An interim portion 48E, between the cross-member attachment portion 48A and the rocker attachment portion 48C of the mount bracket 48, has an L-shaped cross-section in the vehicle lateral direction, which includes a vertical wall portion 48F and a horizontal wall portion 48G.

As shown in FIG. 4, a front wall portion 48H, which is angled toward the upper side of the vehicle, is formed from a vehicle longitudinal direction front end of the vertical wall portion 48B of the cross-member attachment portion 48A of the mount bracket 48, and a rear wall portion 48J, which is angled toward the upper side of the vehicle, is formed from a vehicle longitudinal direction rear end of the vertical wall portion 48B. The front wall portion 48H is joined to a front face of the front wall portion 46B of the floor cross-member 46 by welding or the like, and the rear wall portion 48J is joined to a rear face of the rear wall portion 46C of the floor cross-member 46 by welding or the like.

A front wall portion 48K, which is angled to the vehicle lateral direction outer side, is formed from a vehicle longitudinal direction front end of the vertical wall portion 48F of the interim portion 48E of the mount bracket 48, and a rear wall portion 48L, which is angled to the vehicle lateral direction outer side, is formed from a vehicle longitudinal direction rear end of the vertical wall portion 48F. Further, a flange 48M, which is angled toward the forward side of the vehicle, is formed from a vehicle lateral direction outer side end of the front wall portion 48K, and a flange 48N, which is angled toward the rear side of the vehicle, is formed from a vehicle lateral direction outer side end of the rear wall portion 48L.

As shown in FIG. 3, the flanges 48M and 48N of the mount bracket 48 are joined to a vehicle lateral direction inner side face of the lower portion 44G of the flange 44F of the cross member 44 and to the vertical wall portion 30D of the rocker inner 30, by welding or the like.

As shown in FIG. 4, a front wall portion 48P, which is angled toward the upper side of the vehicle, is formed from a vehicle longitudinal direction front end of the horizontal wall portion 48G of the interim portion 48E of the mount bracket 48, and a rear wall portion 48Q, which is angled toward the upper side of the vehicle, is formed from a vehicle longitudinal direction rear end of the horizontal wall portion 48G. Further, a flange 48R, which is angled toward the front side of the vehicle, is formed from a vehicle lateral direction outer side end of the front wall portion 48P, and a flange 48S, which is angled toward the rear side of the vehicle, is formed from a vehicle lateral direction outer side end of the rear wall portion 48Q.

As shown in FIG. 3, the flanges 48R and 48S of the mount bracket 48 are joined to a bottom wall portion 30E of the rocker inner 30, by welding or the like.

Thus, as shown in FIG. 1, a closed cavity 51 is formed by the mount bracket 48 with the rocker 22 and/or the floor cross-member 46. A vehicle lateral direction outer side portion 51A of the closed cavity 51 extends beneath the rocker inner 30 of the rocker 22.

Herein, a "closed cavity" means a cavity at which an outer periphery portion of the subject cavity is substantially continuous and has high strength and high rigidity. The point of "substantially" is to include a structure of the subject cavity in which holes and the like which are small compared to an outer periphery area are locally formed.

As shown in FIG. 1, a through-hole 60 is formed at a middle portion of the horizontal wall portion 48G of the interim portion 48E of the mount bracket 48. A nut 62, which serves as a body mount-joining member, is disposed along the vehicle vertical direction between the bottom wall portion 46E of the floor cross-member 46 and the horizontal wall portion 48G of the mount bracket 48. An upper end portion 62A of the nut 62 is inserted into the through-hole 54 in the bottom wall portion 46E of the floor cross-member 46, and joined thereto by welding. A lower end portion 62B of the nut 62 is coaxially abutted against an edge portion of the through-hole 60 in the horizontal wall portion 48G of the mount bracket 48.

As shown in FIG. 2, a body mount 70 is provided at the chassis frame outer 14 of the chassis frame 10. The body 12 is attached to the chassis frame 10 via the body mount 70. The body mount 70 is provided with a mount rubber support 72 and a mount rubber 74. The mount rubber support 72 has a box shape, of which a vehicle lateral direction inner side is open.

As shown in FIG. 1, an opening edge portion 72A at the vehicle lateral direction inner side of the mount rubber support 72 is joined to a lower portion of the chassis frame outer 14 by welding. A mount rubber attachment portion 80 is formed at a top wall portion 72B of the mount rubber support 72, and a vertical direction middle portion of the mount rubber 74 is fixed at the mount rubber attachment portion 80.

A working hole 82 is formed in a bottom wall portion 72C of the mount rubber support 72. A bolt 84, for attaching the body 12 to the mount rubber 74 of the body mount 70, is fitted in through this working hole 82. The bolt 84 is inserted from the lower side of the vehicle into a collar 86, which is provided along an axis of the mount rubber 74, and a threaded portion 84A, which is formed at a distal end portion of the bolt 84, passes through the through-hole 60 and threadingly engages with the nut 62.

Next, operation of the present embodiment will be described.

In the present embodiment, as described above, the lower side joining flange 22B of each of the pair of left and right rockers 22, which are arranged along the vehicle longitudinal direction at lower portions of the two vehicle lateral direction ends of the body 12, and the vehicle lateral direction outer side end portion 46D of the bottom wall portion 46A of each of the floor cross-members 46, which are provided at the two vehicle lateral direction end portions of the cross member 44 which is arranged in the vehicle lateral direction at a lower portion of the body 12, are linked by the mount bracket 48. The mount bracket 48, with the rocker 22 and the floor cross-member 46, forms the closed cavity 51 of which the vehicle lateral direction outer side portion 51A extends beneath the rocker inner 30. The mount bracket 48 and the body mount 70 are joined by the nut 62 disposed in the closed cavity 51. Consequently, a supporting stiffness of the nut 62 is improved by the mount bracket 48, and an offset amount S1 between the rocker 22 and the body mount 70 in the vehicle lateral direction is made small.

Therefore, with the present embodiment, deformation of the mount bracket 48 when a load is transmitted from the rocker 22 to the body mount 70 is suppressed. Consequently, a load can be efficiently transmitted from the rocker 22 to the body mount 70 via the closed cavity 51 formed by the mount bracket 48. Moreover, a joining stiffness between the rocker 22 and the vehicle lateral direction closed section portion 50 is raised by the closed cavity 51 formed by the mount bracket 48. Consequently, body endurance at times of running on poor roads can be improved.

Furthermore, with the present embodiment, because reinforcement of the mount bracket 48 is not required, there is no great increase in weight.

Further yet, in the present embodiment, the center pillar 24 is provided at the vehicle lateral direction outer side of the mount bracket 48. Therefore, at a time of rollover, a load that acts on the center pillar 24 (arrow F1 in FIG. 1) can be efficiently transmitted from the body mount 70 to the chassis frame 10 via the rocker 22 and the mount bracket 48. As a result, a displacement of the center pillar 24 with respect to the chassis frame 10, which occurs at a time of rollover, can be suppressed.

Next, a second embodiment of the body support structure of a vehicle of the present invention will be described in association with FIG. 6.

Here, members that are the same as in the first embodiment are assigned the same reference numerals, and descriptions thereof will not be given.

Figure 6:
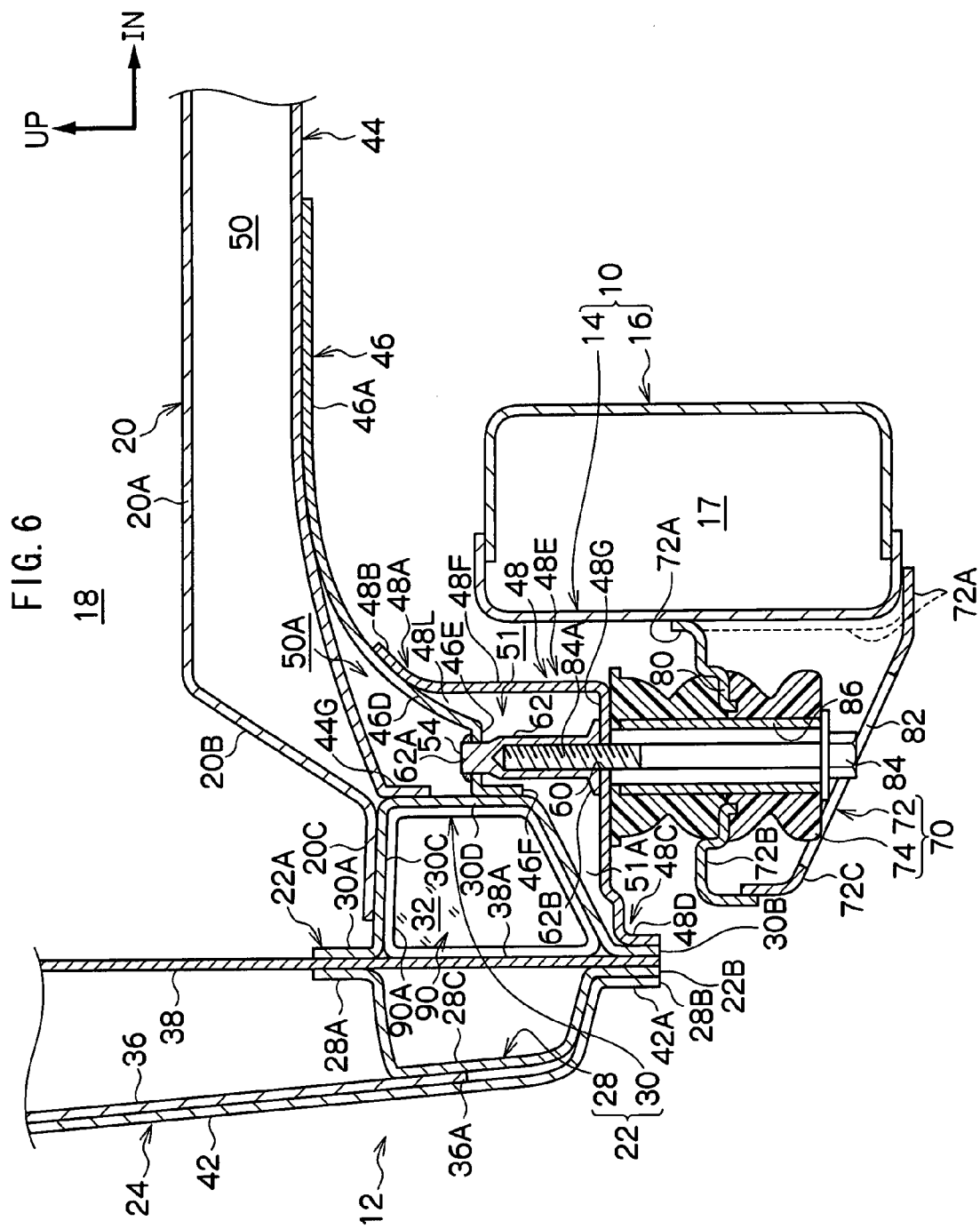
FIG. 6 is a sectional view, corresponding to FIG. 1, showing a vehicle body support structure relating to a second embodiment of the present invention.

FIG. 6 shows a sectional view, corresponding to FIG. 1, of the vehicle body support structure relating to the second embodiment of the present invention.

As shown in FIG. 6, in the present embodiment, a bulkhead 90 is provided to serve as a reinforcing member in the closed section structure that is formed by the rocker inner 30 and the center pillar inner panel 38 at the closed section structure 32 of the rocker 22. A flange 90A, which is formed at a peripheral edge portion of the bulkhead 90, is joined with the rocker inner 30 and the center pillar inner panel 38 by welding or the like.

The bulkhead 90 is disposed at a position of attachment of the mount bracket 48 to the rocker inner 30. More specifically, the bulkhead 90 is disposed at each of positions which are at vehicle lateral direction outer sides relative to the front wall portion 48K and the rear wall portion 48L of the mount bracket 48 (see FIG. 4).

Accordingly, in the present embodiment, in addition to the operational effects of the first embodiment, deformation of the closed section structure formed by the rocker inner 30 and the center pillar inner panel 38 is suppressed by the bulkheads 90 provided in the closed section structure. Therefore, supporting stiffness of the mount bracket 48 can be further improved.

Hereabove, particular embodiments of the present invention have been described in detail. However, the present invention is not limited to the embodiments described above, and it will be apparent to one skilled in the art that many other embodiments are possible within the scope of the present invention. For example, in the embodiments described above, the vehicle lateral direction closed section portion 50 is formed by joining the cross member 44 and the floor cross-member 46 to the lower face of the floor panel 20. Instead of this, however, a structure is possible in which the vehicle lateral direction closed section portion 50 is formed by joining the cross member 44 and the floor cross-member 46 above an upper face of the floor panel 20. Furthermore, the cross member 44 and the floor cross-member 46 could be a single member.

Further, in the embodiments described above, the nut 62 is used as a body mount-joining member, but the body mount-joining member is not limited to a nut. Other body mount-joining members are possible, as long as the member joins the mount bracket 48 with the body mount 70.

Further, in the embodiments described above, the closed section structure 32 is formed by the rocker outer 28 and the rocker inner 30, but a structure is possible in which the rocker 22 is formed as a closed section structure by extruding a material or the like.

Furthermore, in the embodiments described above, the lower flange 48D at the vehicle lateral direction outer side end portion of the mount bracket 48 is joined to the vehicle lateral direction inner side face of the lower flange 30B of the rocker inner 30. However, the lower flange 48D at the vehicle lateral direction outer side end portion of the mount bracket 48 may be joined to another position of a lower portion of the rocker inner 30, provided the position is such that the vehicle lateral direction inner side portion 51A of the closed cavity 51 extends beneath the rocker 22.

A first aspect of the present invention is a vehicle body support structure, including a body mount provided at a chassis frame, the body mount supporting a body; a rocker disposed with a length direction thereof aligned along a vehicle longitudinal direction at a lower portion of each of two vehicle lateral direction ends of the body; a vehicle lateral direction closed section portion, formed with a length direction thereof aligned along the vehicle lateral direction at a lower portion of the body, a vehicle lateral direction end portion of the vehicle lateral direction closed section portion being joined to the rocker; a mount bracket of which a vehicle lateral direction outer side portion is joined to a lower portion of the rocker, a vehicle lateral direction inner side portion of the mount bracket being joined to a lower face of the vehicle lateral direction closed section portion and forming a closed cavity which extends beneath the rocker; and a body mount-joining member that joins the body mount with the mount bracket.

A lower portion of the rocker, of which the length direction is arranged along the vehicle longitudinal direction at the lower portion of each of the two vehicle lateral direction ends of the body, and the lower face of the vehicle lateral direction closed section portion, which is formed with the length direction thereof along the vehicle lateral direction at the lower portion of the body and of which the vehicle lateral direction end portion is joined to the rocker, are joined by the mount bracket. The closed cavity, of which a vehicle lateral direction outer side portion extends beneath the rocker, is formed by the mount bracket. Further, the body mount provided at the chassis frame and the mount bracket at the body are joined by the body mount-joining member. Consequently, supporting stiffness of the body mount-joining member is improved and an offset amount in the vehicle lateral direction between the rocker and the body mount is reduced. Hence, when a load is transmitted from the rocker to the body mount, deformation of the mount bracket is suppressed, and the load is efficiently transmitted from the rocker to the body mount. Moreover, because reinforcement of the mount bracket is not required, weight will not be greatly increased.

Therefore, loads can be more efficiently transmitted from the rockers to the body mounts, without association with a large increase in weight.

In the aspect described above, a pillar disposed with a length direction thereof aligned along a vehicle vertical direction may be provided, a lower end portion of the pillar being joined to the rocker, the pillar being disposed at each of two vehicle lateral direction end portions of the body, and the pillar being disposed at a vehicle lateral direction outer side of the mount bracket.

According to the above-described aspect, at a time of rollover, a load acting on the pillar of which the lower end portion is joined to the rocker is more efficiently transmitted from the body mount to the chassis frame via the rocker and the mount bracket.

In the aspect described above, the vehicle lateral direction closed section portion may include two cross-sectional portions at a vehicle lateral direction end portion thereof.

According to the above-described aspect, deformation of the mount bracket when a load is transmitted from the rocker to the body mount is further suppressed, and loads are more efficiently transmitted from the rockers to the body mounts.

What is claimed is:

1. A vehicle body support structure, comprising:
   a body mount provided at a chassis frame, the body mount supporting a body;
   a rocker disposed with a length direction thereof aligned along a vehicle longitudinal direction, at a lower portion of each of two vehicle lateral direction ends of the body;
   a vehicle lateral direction closed section portion, formed with a length direction thereof aligned along the vehicle lateral direction at the lower portion of the body, a vehicle lateral direction end portion of the vehicle lateral direction closed section portion being joined to the rocker;
   a mount bracket of which a vehicle lateral direction outer side portion is joined to a lower portion of the rocker, a vehicle lateral direction inner side portion of the mount bracket being joined to a lower face of the vehicle lateral direction closed section portion and forming a closed cavity, at least a portion of the closed cavity extends directly beneath the rocker; and
   a body mount-joining member that joins the body mount with the mount bracket.

2. The vehicle body support structure of claim 1, further comprising a pillar disposed with a length direction thereof aligned along a vehicle vertical direction, a lower end portion of the pillar being joined to the rocker, the pillar being disposed at each of the two vehicle lateral direction end portions of the body, and the pillar being disposed at a same vehicle longitudinal position as the vehicle lateral direction outer side portion of the mount bracket.

3. The vehicle body support structure of claim 1, wherein the vehicle lateral direction closed section portion comprises two cross-sectional portions at the vehicle lateral direction end portion thereof.

4. The vehicle body support structure of claim 1, wherein the rocker forms a closed section structure along the longitudinal direction of the vehicle, and
   at least a portion of the closed cavity formed by the vehicle lateral direction inner side portion of the mount bracket extends directly beneath the closed section structure of the rocker.

* * * * *